United States Patent
Khoury et al.

(10) Patent No.: US 9,824,692 B1
(45) Date of Patent: Nov. 21, 2017

(54) END-TO-END SPEAKER RECOGNITION USING DEEP NEURAL NETWORK

(71) Applicant: PINDROP SECURITY, INC., Atlanta, GA (US)

(72) Inventors: Elie Khoury, Atlanta, GA (US); Matthew Garland, Atlanta, GA (US)

(73) Assignee: PINDROP SECURITY, INC., Atlanta, GA (US)

( * ) Notice: Subject to any disclaimer, the term of this patent is extended or adjusted under 35 U.S.C. 154(b) by 0 days.

(21) Appl. No.: 15/262,748

(22) Filed: Sep. 12, 2016

(51) Int. Cl.
| | |
|---|---|
| *G10L 17/18* | (2013.01) |
| *G10L 15/16* | (2006.01) |
| *G10L 17/04* | (2013.01) |
| *G10L 17/08* | (2013.01) |
| *G10L 17/02* | (2013.01) |
| *G10L 17/22* | (2013.01) |
| *G06N 3/04* | (2006.01) |
| *G06N 3/08* | (2006.01) |

(52) U.S. Cl.
CPC ............... *G10L 17/08* (2013.01); *G06N 3/04* (2013.01); *G06N 3/08* (2013.01); *G10L 15/16* (2013.01); *G10L 17/02* (2013.01); *G10L 17/04* (2013.01); *G10L 17/22* (2013.01); *G10L 17/18* (2013.01)

(58) Field of Classification Search
CPC .......... G10L 17/18; G10L 15/16; G10L 17/04
See application file for complete search history.

(56) References Cited

U.S. PATENT DOCUMENTS

| | | | | |
|---|---|---|---|---|
| 2014/0214417 | A1* | 7/2014 | Wang | G10L 17/18 704/232 |
| 2015/0127336 | A1* | 5/2015 | Lei | G10L 17/18 704/232 |
| 2016/0293167 | A1* | 10/2016 | Chen | G10L 17/18 |
| 2017/0069327 | A1* | 3/2017 | Heigold | G10L 17/18 |

OTHER PUBLICATIONS

Douglas A. Reynolds et al., "Speaker Verification Using Adapted Gaussian Mixture Models," Digital Signal Processing 10, 2000, pp. 19-41.
Elad Hoffer, et al. "Deep Metric Learning Using Triplet Network", ICLR 2015 (workshop contribution), Mar. 23, 2015, retrieved from <https://arxiv.org/pdf/1412.6622v3.pdf> on Dec. 8, 2016.
Fred Richardson, et al. "Deep Neural Network Approaches to Speaker and Language Recognition", IEEE Signal Processing Letters, vol. 22, No. 10, Oct. 2015, pp. 1671-1675.

(Continued)

*Primary Examiner* — Matthew Baker
(74) *Attorney, Agent, or Firm* — Birch, Stewart, Kolasch & Birch, LLP

(57) ABSTRACT

The present invention is directed to a deep neural network (DNN) having a triplet network architecture, which is suitable to perform speaker recognition. In particular, the DNN includes three feed-forward neural networks, which are trained according to a batch process utilizing a cohort set of negative training samples. After each batch of training samples is processed, the DNN may be trained according to a loss function, e.g., utilizing a cosine measure of similarity between respective samples, along with positive and negative margins, to provide a robust representation of voiceprints.

26 Claims, 10 Drawing Sheets

(56) References Cited

OTHER PUBLICATIONS

N. Dehak et al., "Front-End Factor Analysis for Speaker Verification," IEEE Transactions on Audio, Speech, and Language Processing, vol. 19, No. 4, pp. 788-798, May 2011.
P. Kenny, et al. "Deep Neural Networks for extracting Baum-Welch statistics for Speaker Recognition", Proc. Odyssey Speaker and Language Recognition Workshop, Joensuu, Finland, Jun. 2014.
Y. Lei et al., "A Novel Scheme for Speaker Recognition Using a Phonetically-Aware Deep Neural Network," Proceedings of ICASSP 2014, May 2014, retrieved from <https://www.sri.com/sites/default/files/publication/dnn.pdf> on Dec. 8, 2016.

* cited by examiner

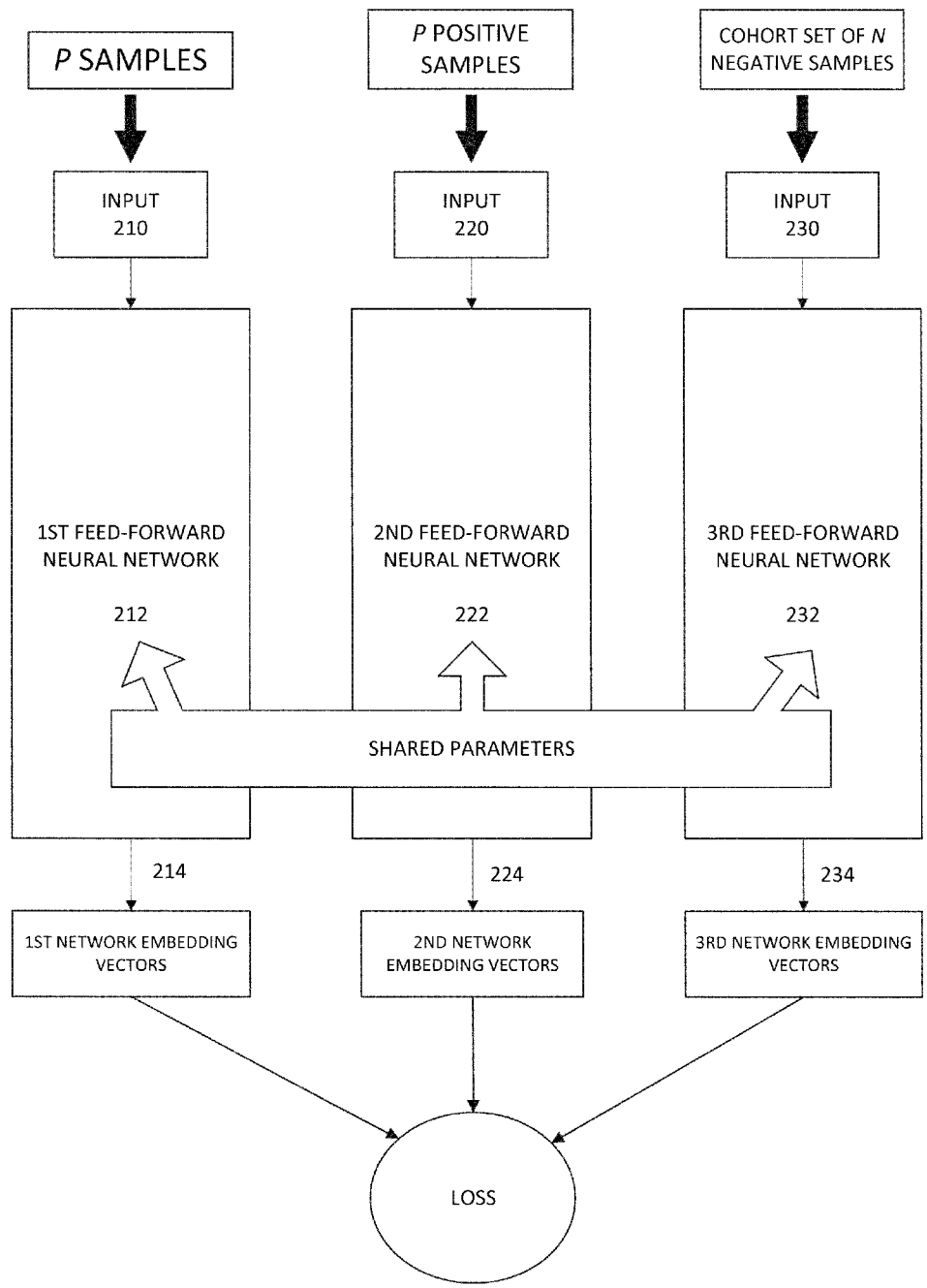

END-TO-END SPEAKER RECOGNITION USING DEEP NEURAL NETWORK

FIELD OF THE INVENTION

The present invention is directed to voice recognition including speaker verification and/or identification of the speaker. Further, the present invention may be used to conduct text-independent speaker recognition.

BACKGROUND OF THE INVENTION

Current state-of-the art approaches to speaker recognition are based on a universal background model (UBM) estimated using either acoustic Gaussian mixture modeling (GMM) (see Douglas A. Reynolds et al., "Speaker Verification Using Adapted Gaussian Mixture Models," Digital Signal Processing, 2000, the entire contents of which are herein incorporated by reference) or phonetically-aware deep neural network architecture (see Y. Lei et al., "A Novel Scheme for Speaker Recognition Using a Phonetically-Aware Deep Neural Network," Proceedings of ICASSP 2014, the entire contents of which are herein incorporate by reference). The most successful techniques consist of adapting the UBM model to every speech utterance using the total variability paradigm (see N. Dehak et al., "Front-End Factor Analysis for Speaker Verification," IEEE Transactions on Audio, Speech, and Language Processing, Vol. 19, No. 4, pp. 788-798, May 2011, the entire contents of which are herein incorporated by reference). The total variability paradigm aims to extract a low-dimensional feature vector known as an "i-vector" that preserves the total information about the speaker and the channel. After applying channel compensation technique, the resulting i-vector can be considered a voiceprint or voice signature of the speaker.

The main drawback of such approaches is that, by only using handcrafted features designed to reproduce the human perception system, they tend to discard useful information that is important to recognize or verify speakers. Typically, the aforementioned approaches utilize low-level features, such as Mel Frequency Cepstrum Coefficients (MFCCs), and attempt to fit them to a fixed number of Gaussian distributions (typically 1024 or 2048 Gaussians). This makes it difficult to model complex structures in a feature space where the Gaussian assumption does not necessary hold.

SUMMARY OF THE INVENTION

The present invention is directed to a system that utilizes a deep neural network with a triplet network architecture to train a front-end feature extractor, which is used to perform a task of verification of a speaker's identity or identifying a speaker among a closed set of known speakers.

According to an exemplary embodiment, the system is comprised of a memory device and a processor-based device. The memory device stores speech samples which include: dual sets of speech samples attributed to the same speaker, a cohort set of speech samples not attributed to the same speaker as the dual sets, and a set of speaker models. Further, the processor-based device is configured to model a deep neural network with a triplet network architecture. The processor-based device trains the deep neural network according to a batch process in which the dual sets of speech samples are fed through the deep neural network in combination with the cohort set of speech samples.

According to a further exemplary embodiment, the deep neural network may include a first feed-forward neural network which receives and processes a first input to produce a first network output, a second feed-forward neural network which receives and processes a second input to produce a second network output, and a third feed-forward neural network which receives and processes a third input to produce a third network output. Also, for each of a plurality of speakers, the memory device includes a first set of P speech samples $(x_1, \ldots, x_P)$ attributed to the speaker and a second set of P speech samples $(x_1^+, \ldots, x_P^+)$ attributed to the speaker, with P being an integer greater than or equal to 2. The deep neural network is trained by the processor-based device such that, for each of the plurality of speakers, the deep neural network performs a batch processing during which the corresponding first set of speech samples are fed through the first feed-forward neural network, the corresponding second set of speech samples are fed through the second feed-forward neural network, and the cohort set of speech samples are fed through the third feed-forward neural network. upon completion of the batch processing, a loss function is computed based on the first network outputs, the second network outputs, and the third network outputs obtained based respectively on the corresponding first set of speech samples, the corresponding second set of speech samples, and the cohort set of speech samples. The computed loss function is used to modify connection weights in each of the first, second, and third feed-forward neural networks according to a back propagation technique.

According to a further exemplary embodiment, the aforementioned loss function may be based on: a positive distance $d_+$ corresponding to a degree of similarity $S_+$ between the first network output responsive to one of the first set of speech samples $x_i$ and the second network output responsive to a corresponding one of the second set of speech samples $x_i^+$, and a negative distance $d_-$ corresponding to a degree of similarity $S_-$ between the first network output responsive to the one of the first set of speech samples $x_i$ and a most similar one of the third network outputs responsive to respective speech samples of the cohort set. Further, the positive distance $d_+$ and the negative distance $d_-$ may be determined by applying different respective margins $M_+$, $M_-$ to the corresponding degrees of similarity $S_+$, $S_-$. In particular, the loss function may be defined as $$\text{Loss} = \sum_{i=1}^{P} L(x_i, x_i^+, X^-), \text{ where } L(x_i, x_i^+) = K \frac{e^{d_+}}{e^{d_+} + e^{d_-}},$$

$$d_+ = 2(1 - \min((S_+ + M_+), 1)),$$

$$d_- = 2(1 - \max((S_+ + M_- - 1), 0)), S_+ = \frac{1}{2}(1 + \cos(EVx_i, EVx_i^+)),$$

$$S_- = \frac{1}{2}(1 + \max_{n=1:N}(\cos(EVx_i, EVx_n^-))),$$

$x_n^-$ is the n-th one of the N negative speech samples fed during the N iterations, $EVx_i$ is the first network output responsive to one of the first set of speech samples, $EVx_i^+$ is the second network output responsive to one of the second set of speech samples, $EVx_n^-$ is the third network output responsive to the negative speech sample $x_n^-$, $$M_+ = \frac{1 - \cos\left(\frac{\pi}{4}\right)}{2}, M_- = \frac{1 - \cos\left(\frac{3\pi}{4}\right)}{2},$$

and K is a constant.

According to an alternative exemplary embodiment, the loss function may be related to the Equal Error Rate (EER) metric. In this case, the loss function could be defined as $$\text{Loss} = e^{-\frac{\mu_+ - \mu_-}{(\sigma_+ + \sigma_-)\sqrt{2}}},$$

where $\mu_+$ and $\sigma_+$ are the mean and standard deviation of positive recognition scores based on a Gaussian distribution, and $\mu_-$ and $\sigma_-$ are the mean and standard deviation of negative recognition scores based on a Gaussian distribution.

According to an exemplary embodiment, each of the feed-forward neural networks employed in the triplet network architecture may include at least one convolutional layer at least one max-pooling layer, and a fully connected layer.

Furthermore, in one exemplary embodiment, the present invention can be used to perform a speaker verification task in which the user inputs a self-identification, and the recognition speech sample is used to confirm that an identity of the user is the same as the self-identification. In another exemplary embodiment, the present invention can be used to perform a speaker identification task in which the recognition speech sample is used to identify the user from a plurality of potential identities stored in association with respective speech samples. The aforementioned embodiments are not mutually exclusive, and the same triplet neural network may be used to perform both tasks.

BRIEF DESCRIPTION OF THE DRAWINGS

FIG. 2A illustrates a general structure of a deep neural network having a triplet network architecture for use in training, according to exemplary embodiments of the present invention.

DETAILED DESCRIPTION

A more detailed description of the invention will now be provided in reference to the accompanying drawings.

Exemplary embodiments of the present invention are directed to a system and method utilizing a deep neural network (DNN) having a triplet network architecture, to conduct text-independent speaker recognition. The terms "deep neural network" and "DNN" refer to a neural network with multiple hidden layers, composed of multiple linear and non-linear transformation functions. In this application, two subtasks of speaker recognition are considered: verification and identification. For purposes of this application, "verification" refers to the task of detecting if the actual speaker is whom he/she claims to be, while "identification" refers to the task of retrieving the identity of the speaker from a predetermined list of speakers. Principles of the present invention described hereinbelow can be applied to either or both of these subtasks. Also, in this application, the term "user" will sometimes be used to refer to a particular speaker for whom the DNN is trained to recognize.

The use of a DNN to perform speaker recognition is advantageous over other approaches that utilize a universal background model (UBM) estimated using a Gaussian mixture model (GMM), because a DNN is better at representing low-level features and mapping them to high-level features. The low-level features could be as low as the raw speech signal. The high-level features are the voiceprints that preserve the total variability of the speech signal. As such, the voiceprint extracted by a DNN may resemble an i-vector obtained by the UBM/GMM, but gives superior results.

Figure 1:
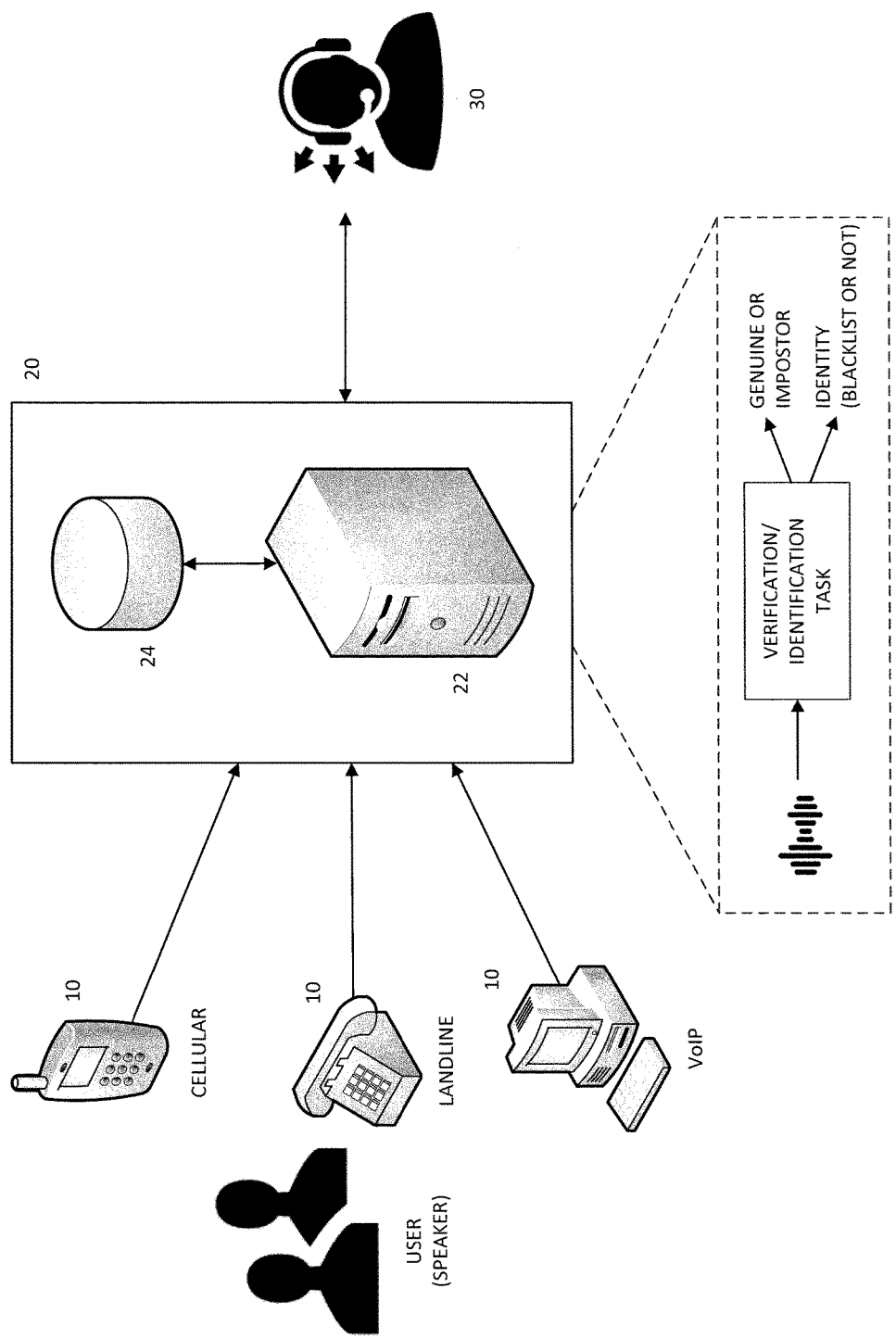
FIG. 1 illustrates a system for performing speaker recognition according to an exemplary embodiment of the present invention.

FIG. 1 illustrates a system for performing speaker recognition according to an exemplary embodiment of the present invention. According to FIG. 1, a user or speaker may speak an utterance into input device 10 containing a microphone for converting the uttered sound into an electrical signal. As particularly shown in FIG. 1, the input device 10 may be a device capable of telecommunications, such as a telephone (either cellular or landline) or a computer or other processor based device capable of voice over internet (VoIP) communications. In fact, it is contemplated that the present invention could be utilized specifically in applications to protect against telephone fraud, e.g., verifying that the caller is whom he/she claims to be, or detecting the caller's identity as somebody on a "blacklist" or "blocked callers list."

According to FIG. 1, the user's utterance, which is used to perform speaker identification, will be referred to in this specification as the "recognition speech sample." The recognition speech sample may be electrically transmitted from the input device 10 to a speaker recognition subsystem 20. Although it is contemplated that the input device 10 into which the recognition speech sample is spoken may be a telecommunication device (e.g., phone), this need not be the case. For instance, the input device 10 may simply be a microphone located in close proximity to the speaker recognition subsystem 20.

The speaker recognition subsystem 20 of FIG. 1 may include a computing system 22, which can be a server or a general-purpose personal computer (PC), programmed to model a deep neural network having a triplet network architecture (details of which will be described in more detail below). It should be noted, however, that the computing system 22 is not strictly limited to a single device, but instead may comprise multiple computers and/or devices working in cooperation to perform the operations described in this specification (e.g., training of the DNN may occur in one computing device, while the actual verification/identification task is performed in another). While single or multiple central processing units (CPU) may be used as a computing device for both training and testing, graphics processing units (GPU's) may also be used. For instance, the use of a GPU in the computing system 22 may help reduce the computational cost, especially during training.

As shown in FIG. 1, the speaker recognition subsystem 20 also includes a memory device 24 used for training the DNN in exemplary embodiments. Particularly, this memory device 24 may contain a plurality of sampled speech signals (or "speech samples") from multiple users or speakers, as well as a plurality of registered voiceprints obtained for users who have been "enrolled" into the speaker registration subsystem 20. Particularly, the memory device 24 includes two different datasets corresponding to the respective functions to be performed with respect to the DNN: training and testing.

In regard to the function of training, according to exemplary embodiments of the present invention, the DNN is trained according to positive samples corresponding to multiple speakers, as well as a number N of negative samples. To conduct training, the memory device 24 will preferably contain a dataset including at least two speech samples obtained as actual utterances from each of the multiple speakers. These speech samples are referred to as "positive speech samples" for the relevant speaker. In the memory device 24, the dataset for training the DNN will also include a number N of "negative speech samples" relative to each of the aforementioned speakers. These negative speech samples correspond to utterances by people who are different than the relevant speaker. In a particular example, 1000 negative speech samples (i.e., N=1000) may be used in connection with each of the multiple speakers used to train the DNN. However, the number N can be higher or lower than 1000. It should also be noted that a speech sample of unknown origin may be used as one of the N negative speech samples, regardless of whether or not it can be confirmed that such speech sample originated from a different speaker i than the one currently used to train the DNN.

The memory device 24 may include another dataset to perform the "testing" function, whereby the DNN performs actual speaker recognition by positively verifying or identifying a user. To perform this function, the dataset need only one positive speech sample of the particular user, which may be obtained as a result of "enrolling" the user into the speaker recognition subsystem 22 (which will be described in more detail below). Further, this dataset may include one or more registered voiceprints, corresponding to each user who can be verified/identified by the system.

Referring again to FIG. 1, the results of the speaker recognition analysis can be used by an end application 30 that needs to authenticate the caller (i.e., user), i.e., verifying that the caller is whom he/she claims. As an alternative, the end application 30 may need to identify any caller who is on a predefined list (e.g., blacklist or blocked callers). This can help detect a malicious caller who spoofs a telephone number to evade detection by calling line identification (CLID) (sometimes referred to as "Caller ID"). However, even though the present invention can be used by applications 30 designed to filter out malicious callers, the present invention is not limited to those types of applications 30. For instance, the present invention can be advantageously used in other applications 30, e.g., where voice biometrics are used to unlock access to a room, resource, etc.

It should be noted that various modifications can be made to the system illustrated in FIG. 1. For instance, the input device 10 may transmit the recognition speech sample directly to the end application 30, which in turn relays the recognition speech sample to the speaker recognition subsystem 20. In this case, the end application 30 may also receive some form of input from the user representing a self-identification. For instance, in case of performing a speaker identification task, the end application 30 may request the user to identify him or herself (either audibly or by other forms of input), and send both the recognition speech sample and the user's alleged identity to the speech recognition subsystem 20 for authentication. In other cases, the self-identification of the user may consist of the user's alleged telephone number, as obtained by CLID. Furthermore, there is no limitation in regard to the respective locations of the various elements illustrated in FIG. 1. In certain situations, the end application 30 may be remote from the user, thus requiring the use of telecommunications for the user to interact with the end application 30. Alternatively, the user (and the input device 10) may be in close proximity to the end application 30 at the time of use, e.g., if the application 30 controls a voice-activated security gate, etc.

FIG. 2A illustrates a general structure of a deep neural network (DNN) having a triplet network architecture for use during training, according to exemplary embodiments of the present invention. Also, FIG. 2A illustrates conceptually the use of a batch process in which P audio samples, their corresponding P positive samples, and a cohort set of N negative speech samples are used to train the first, second, and third feed-forward neural networks.

In FIG. 2A, the DNN consists of three instances of the same feed-forward neural network 212, 222, and 232, which share the same parameters. Having shared parameters (as indicated in the figure), the three feed-forward neural networks 212, 222, 232 are identical in the number and configuration of layers, the connection weights between layers, etc. These feed forward neural networks 212, 222, 232 are provided with three different samples via inputs 210, 220, 230, respectively. Particularly, as the DNN is being trained, the DNN may perform a batch processing whereby the first feed-forward neural network 212 and the second feed-forward neural network 222 are fed with a set of P speech samples, each designated as $x_i$ (i=1, . . . , P), and a corresponding set of P positive speech samples, each designated as $x_i^+$, via respective inputs 210 and 220. These two sets of speech samples are spoken by (and thus attributed to) the same speaker. Further, the third feed-forward neural network 232 is fed a common cohort set of negative speech samples $x_1^-$, . . . $x_N^-$ via input 230 during the batch processing. The negative speech samples in the cohort set are not spoken by (or at least not known to be spoken by) the same speaker as the aforementioned sets of P samples, and thus are not attributed to the same speaker. The output 214 of the first feed-forward neural network 212 produces a first set of P embedding vectors responsive to the samples $x_i$, and the output 224 of the second feed-forward neural network 222 produces a second set of P embedding vectors responsive to the samples $x_i^+$. Also, the output 234 of the third feed-forward neural network 232 produces a third set of N embedding vectors responsive to the negative speech samples in the cohort set. After a given batch is processed, these embedding vectors are used to compute a loss (which will be described in more detail below), and the loss is used to modify connection weights in the three feed-forward neural networks 212, 222, 232 according to a back-propagation technique.

Figure 2B:
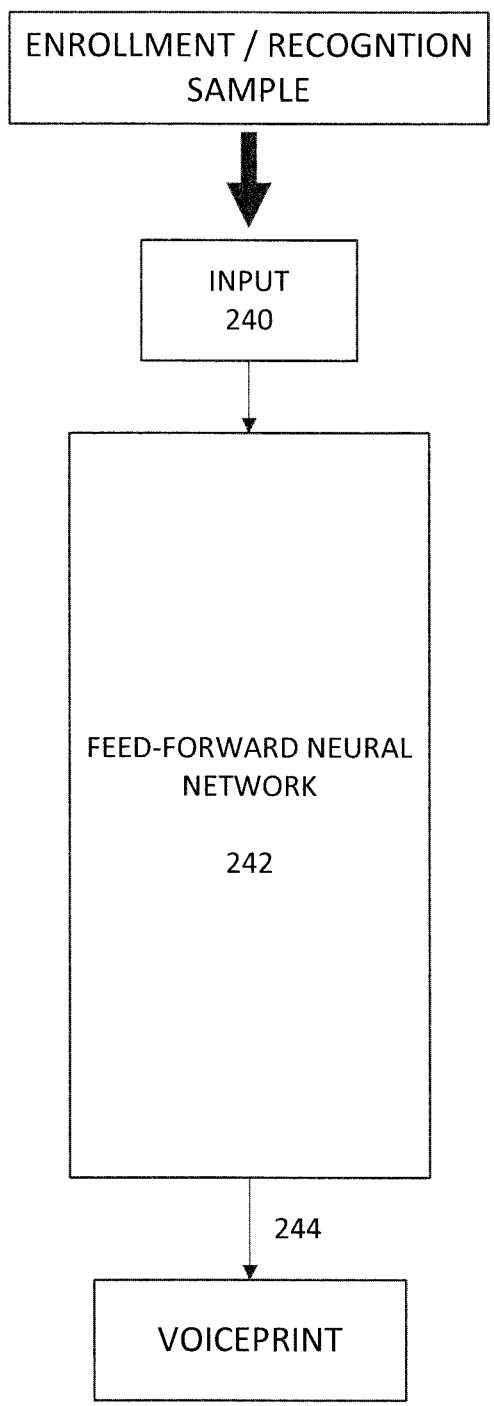
FIG. 2B illustrates a general structure of a deep neural network having a triplet network architecture for use in enrollment and testing for a particular user, according to exemplary embodiments of the present invention.

Furthermore, as shown in FIG. 2B, another feed-forward neural network 242 is used to perform actual speaker recognition based on the recognition speech sample inputted by the user (via input device 10) after training of the DNN is complete. Since the first, second, and third feed-forward neural networks 212, 222, 232 incorporate shared parameters, and thus are identical to one another when training of the DNN is complete, any one of these three feed-forward neural networks may be used interchangeably as the feed-forward neural network 242 that performs speaker recognition. Alternative, a new instance of a feed-forward neural network, incorporating the parameters shared among the three feed-forward neural networks 212, 222, 232 may be used as the feed-forward neural network 242 of FIG. 2B for use in enrolling and/or testing (speaker recognition) of a user. The enrollment and testing performed in accordance with this feed-forward neural network 242 will be described in more detail below.

Now, additional details will be provided on the design of the DNN. As will be discussed below, aspects of a convolutional neural network (CNN) may be combined with those of a DNN by incorporating at least one convolutional layer into each of the first, second, and third feed-forward neural networks 212, 222, 232. Further, each convolutional layer has neurons in three dimensions: height, width, and depth.

Figure 3A:
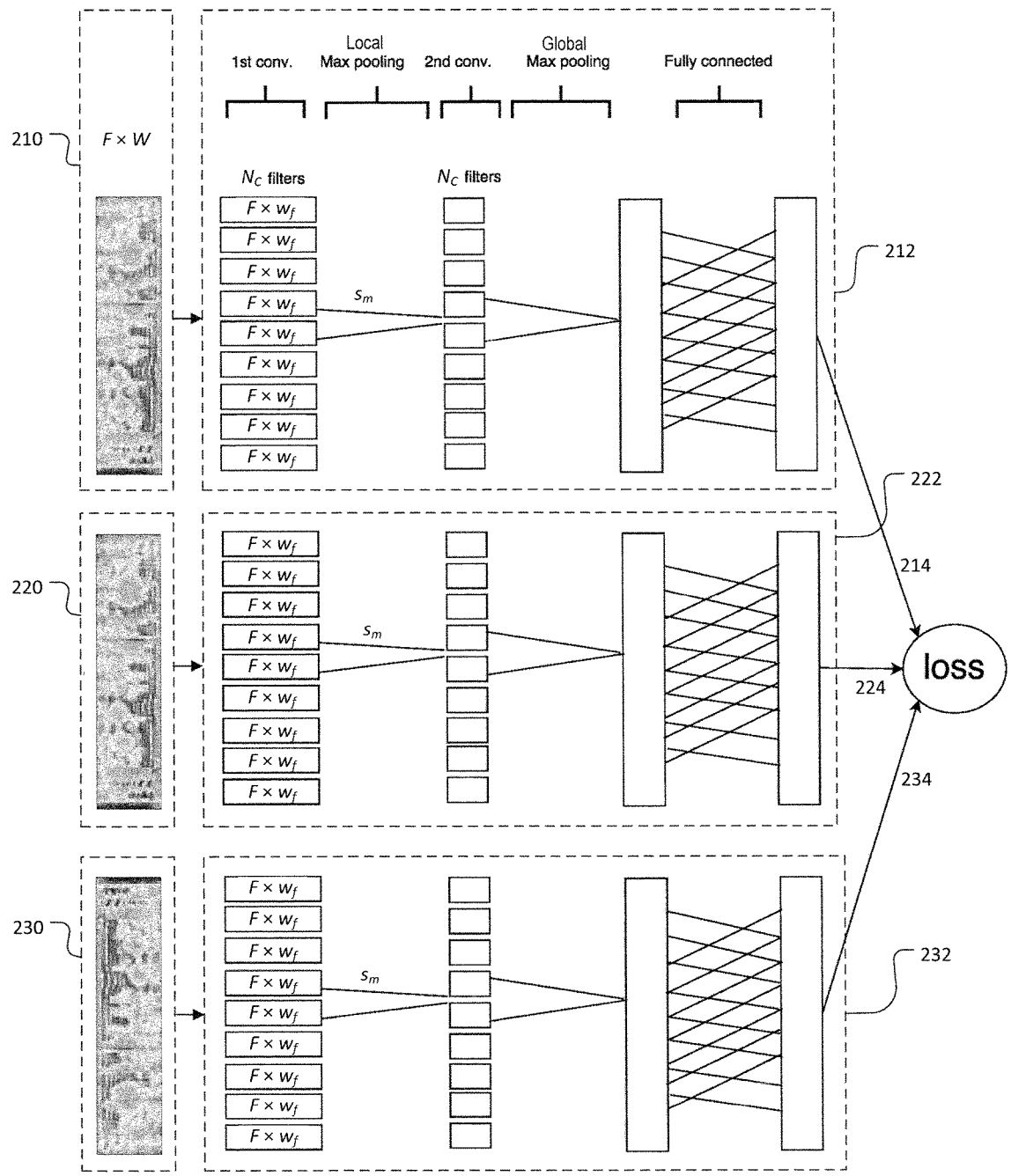
FIG. 3A illustrates a specific example of the structure of a deep neural network with a triplet network architecture, designed to receive pre-processed speech samples, for use in training.

FIG. 3A illustrates a specific example of the structure of a DNN with a triplet network architecture for use in training the DNN. As shown in FIG. 3A, each of the first, second, and third feed-forward neural networks 212, 222, 232 may comprise a first convolutional layer connected to a max-pooling layer, a second convolutional layer followed by a second max-pooling layer, a subsequent fully connected layer, and an output layer which comprises the embedding vector. Upon conclusion of training, however, the output layer of each of the feed-forward neural networks 212, 222, 232 will be configured to produce a feature representation (i.e., voiceprint) of the inputted sample.

Also shown in FIG. 3A are the respective inputs 210, 220, 230 of the first, second, and third feed-forward neural networks 212, 222, 232. According to an exemplary embodiment, prior to being inputted into a respective one of the feed-forward neural networks 212, 222, 232, each of the speech samples (including the speech sample $x_i$, the positive speech samples $x_i^+$, and the negative speech sample $x_n^-$) may be preprocessed so as to generate an "image" of the corresponding utterance. Such preprocessing may include applying voice activity detection in order to discard a non-speech part of the signal. The preprocessing may also include partitioning the underlying speech signal into a certain number (W) of overlapping windows, and extracting a certain number (F) of features (e.g., Mel filterbank features) from each of the W overlapping windows. A specific example of such pre-processing, which is not to be construed as limiting the claims, will now be described. In this non-limiting example, image may be generated for each speech sample by partitioning the underlying speech signal into windows of a 20-millisecond duration, with an overlap (or window shift) of 10 milliseconds. Further, the image for each sample may include 500 of the aforementioned overlapping windows (W=500), with 40 Mel filterbank features (F=40) being extracted from each window (thereby resulting in an image of a size 40×500 in each of the inputs 210, 220, 230). This would correspond to a speech sample with a duration of 5 seconds (with the 40-dimensional feature vector being extracted every 10 milliseconds). However, this is merely an example, and it should be noted that different utterance durations, different numbers of windows, and different numbers and types of features may be used. In other words, different types of speech "images" may be applied to the DNN.

It should be noted that the aforementioned preprocessing may be performed either before or after relevant speech samples are stored in the memory device 24. It is also contemplated that the device 10 that inputs the recognition speech sample from the user, and other types of speech transmitting/recording devices that are used for inputting the positive and negative speech samples, may be configured to perform some or all of the operations of the aforementioned preprocessing.

Referring again to FIG. 3A, assuming that input signal is a preprocessed image of a size F×W as described above, the first convolutional layer of each of the first, second, and third feed-forward neural networks may comprise an appropriate number ($N_C$) of convolutional filters to process such an image. Further, each convolutional filter in this layer may be configured to process the features of a corresponding window, and thus have a size of F×$w_f$ neural units (or "neurons"). As such, each convolutional filter would have a height commensurate with the number of features F, and a width ($w_f$) that can be chosen based on various considerations (e.g., to account for dynamics of speech, to meet processing and memory requirements, etc.).

A specific non-limiting example of the configuration of the first convolutional layer in the feed-forward neural networks 212, 222, 232 of FIG. 3A will now be described. For purposes of this example, it can be assumed that the inputted image is preprocessed with a size (F×W) of 40×500 as mentioned above in connection with the previous non-limiting example regarding preprocessing (corresponding to 5 seconds of speech, with a 40-dimensional feature vector extracted every 10 milliseconds). In this case, the first convolutional layer of each of the first, second, and third feed-forward neural networks may comprise 256 convolutional filters ($N_C$=256), each filter having a height of 40 neurons (corresponding to the 40 features extracted from each window), and a width ($w_f$) not exceeding 5 neurons (e.g., 1 or 3 neurons). In this case, the depth of the first convolutional layer in FIG. 3A would be 256, the height of this layer would be 40, and the width of the layer would be $w_f$≤5. Also, in this non-limiting example, the entry neurons in the first convolutional layer could be connected to multiple windows of the input image.

It should be noted that the above is a non-limiting example, and that the depth and height dimensions of the first convolutional layer may differ from the aforementioned 256 and 40, respectively. In this case, however, it is suggested that the depth (i.e., the number of convolutional filters $N_C$) would preferably be less than or equal to the number of overlapping windows in the inputted image, while the height would preferably be equal to the number of features (e.g., Mel filterbank features) extracted from each of the windows during preprocessing of the relevant speech sample.

Referring again to FIG. 3A, subsequent to the first convolutional layer in each of the feed-forward neural networks 212, 222, 232, a one-dimensional max-pooling layer of a size $s_m$ is provided. A max-pooling layer is a layer that computes a maximum value from a temporally input sequence. In FIG. 3A, the results of the max-pooling layer are provided to a second convolutional layer, comprised of $N_C$ convolutional filters. However, the size of these filters is not necessarily the same as those in the first convolutional layer. In a non-limiting example, the height and width of this second convolutional layer may be 1. Furthermore, according to FIG. 3A, a final global max-pooling layer is applied across the entire time axis, to make the resulting embedding vector less sensitive to the duration of the inputted image. The next layers are a fully connected layer and output layer, e.g., each with $N_C$ neurons. The output layer provides the embedding vector during training, but after training is configured to produce the feature representation, i.e., the voiceprint or voice signature of the speaker who originated the sample. Specifically, the output layers of the respective first, second, and third feed-forward neural networks 212, 222, 232 are what were previously referred to as the first, second, and third networks outputs 214, 224, 234 of the DNN.

For instance, during training, when the image of a speech sample $x_i^+$ is fed through the first feed-forward neural network 212, the first network output 214 produces a result which may be symbolized as $EVx_i$, which stands for the embedded vector for $x_i^+$. Similarly, when the image of a positive speech sample $x_i^+$ is fed through the second feed-forward neural network 222, the second network output 224 produces a result which may be symbolized as $EVx_i^+$, which stands for the embedded vector for $x_i^+$. Similarly, when the image of a negative speech sample $x_n^-$ is fed through the third feed-forward neural network 232 (with n being an arbitrary integer between 1 and N), the third network output 234 produces a result which may be symbolized as $EVx_n^-$, which stands for the embedded vector for $x_n^-$.

As shown in FIG. 3A, after a given batch of training samples are processed, a loss function may be calculated based on the respective outputs 214, 224, 234 of the first, second, and third feed-forward neural networks 212, 222, 232. The computed loss function may be used to train the respective neural networks 212, 222, 232 of the DNN using a backpropagation algorithm with a "stochastic gradient descent" optimizer, which aims at computing the gradient of the loss function with respect to all the weights in the DNN. The goal of the optimizer is to update the weights, in order to minimize the loss function. However, it is also contemplated that other types of backpropagation algorithms may be used. In the example of FIG. 3A, the loss function can be used to update the connection weights in each of the first convolutional layer, the second convolutional layer, and the fully connected layer. More details regarding the training algorithm will be discussed below in connection with FIG. 6.

Figure 3B:
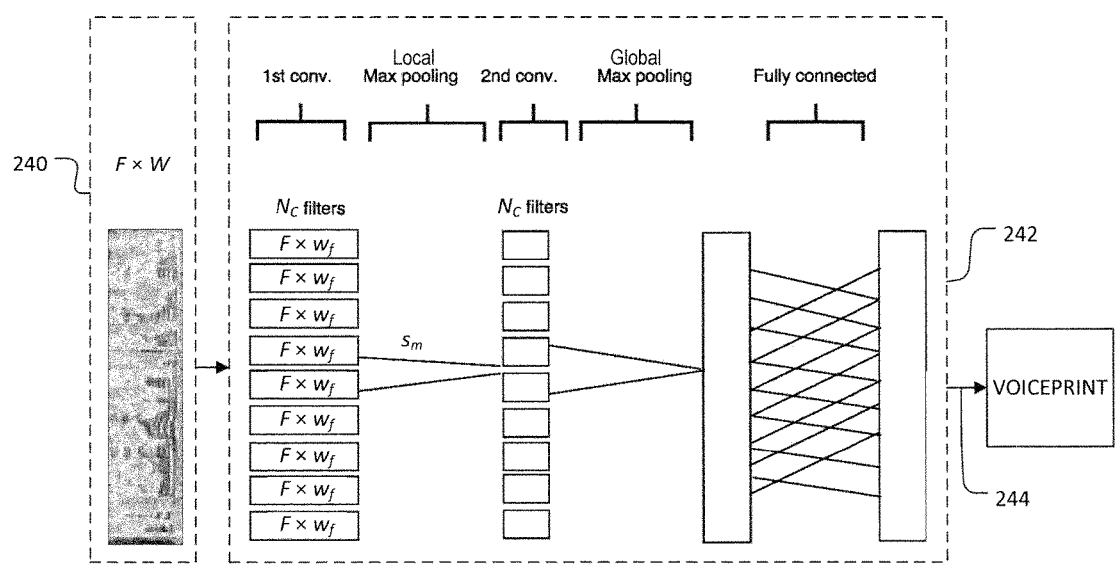
FIG. 3B illustrates a specific example of the structure of a deep neural network architecture for use in enrollment and testing for a particular user.

Now, reference will be made to FIG. 3B, which illustrates a specific example of a DNN architecture for use in enrollment and testing for a particular user. Particularly, FIG. 3B illustrates a feed-forward neural network 242 for performing the enrollment and testing functions. As mentioned above in connection with FIG. 2B, the configuration and parameters of the feed-forward neural network 242 in FIG. 3B will share the same configuration and parameters as each of the first, second, and third feed-forward neural networks 212, 222, 232 after the DNN of FIG. 3A has been trained. As such, at the conclusion of training, any one of the first, second, and third feed-forward neural networks 212, 222, 232 may be used as the feed-forward neural network 242 of FIG. 3B, or a new instance of a neural network incorporating the shared parameters and configuration may be used.

As shown in FIG. 3B, the neural network 242 may receive at its input 240 an image generated by preprocessing of a speech sample. Depending on whether enrollment or testing is being performed, the inputted image will correspond either to a speech sample inputted for the purpose of enrolling or registering a particular user (i.e., an "enrollment speech sample"), or a speech sample upon which speaker recognition is to be conducted (i.e., a "recognition speech sample"). Once the inputted image is fed through the feed-forward neural network 242, the output layer 240 will produce a corresponding feature presentation (i.e., voiceprint). Each feature representation produced by the output layer 240 may resemble an i-vector, but is designed to better represent the low-level features in the speaker's voice since they were produced by a DNN.

Figure 3C:
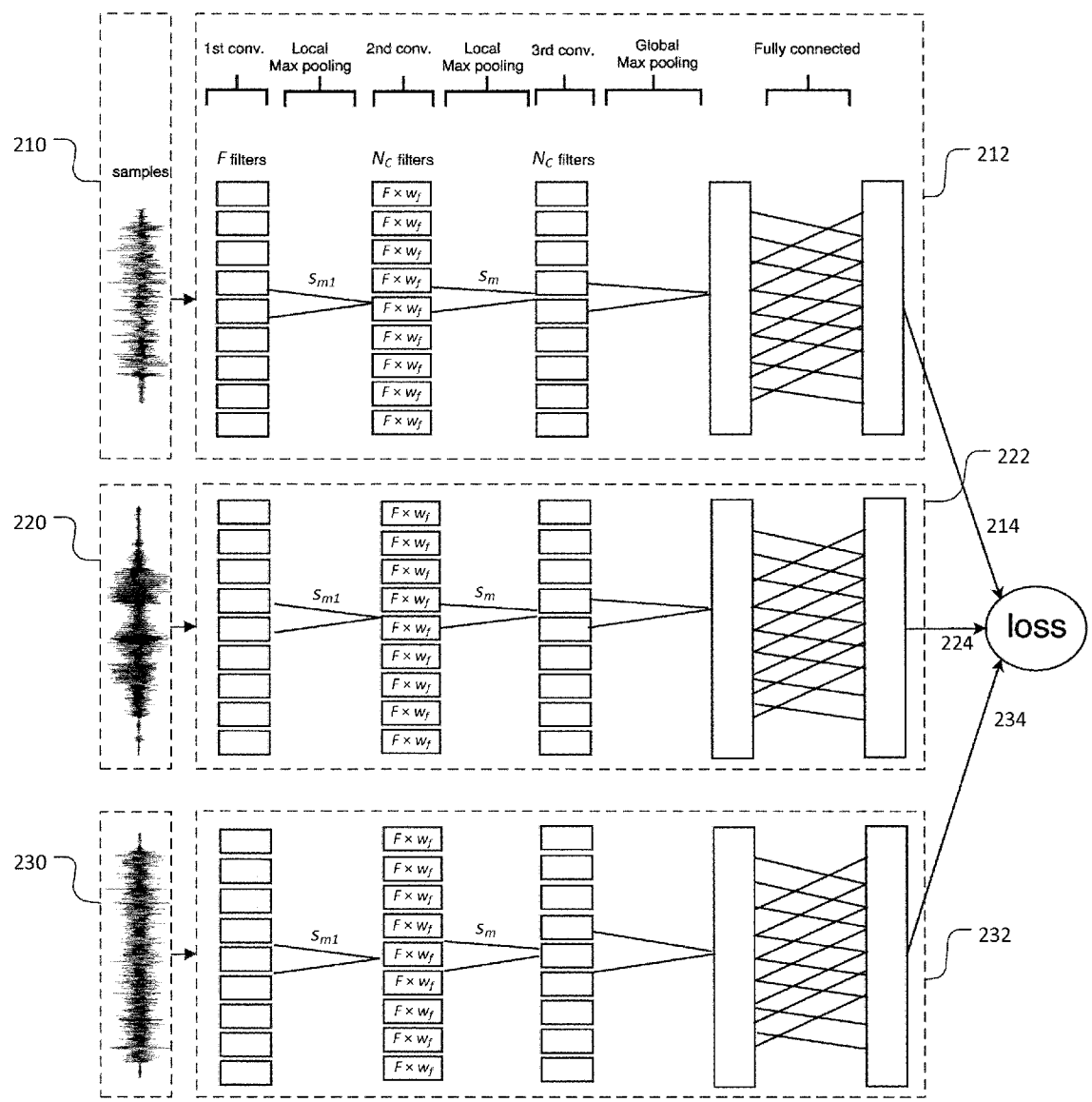
FIG. 3C illustrates another specific example of the structure of a deep neural network with a triplet network architecture, designed to process raw speech samples, for use in training.

As mentioned above, the example DNN architecture in both FIG. 3A and FIG. 3B is based on the assumption that each inputted speech sample is preprocessed as an image. However, this need not be the case. For instance, the DNN may take on a different triplet network architecture that FIG. 3C illustrates an example of a deep neural network with a triplet network architecture for processing raw speech samples as inputs. Particularly, as shown in FIG. 3C, the speech samples received at the respective inputs 210, 220, and 230 of the respective feed-forward neural networks 212, 222, and 232 are not preprocessed in the manner described above in connection with FIG. 3A and FIG. 3B. Instead, each inputted sample constitutes a signal obtained by sampling the raw speech signal (e.g., as inputted via an input device 10) to obtain a sequence of samples. Further, as shown in the particular example of FIG. 3C, each of the first, second, and third feed-forward neural networks 212, 222, 232 includes an additional convolutional layer and local max-pooling, which are positioned in front of other layers that are analogous to ones described in connection FIG. 3A. The added convolutional layer of FIG. 3C, which is shown as receiving the raw speech sample, is comprised of a number (F) of convolutional filters corresponding to the number of features to be extracted from the raw speech sample. The added max-pooling layer may be a one-dimensional layer of a size $s_{m1}$. These additional layers may be configured to apply transformations that are analogous to the preprocessing described above in connection with FIG. 3A and FIG. 3B.

Now, reference will be made to FIG. 4, which illustrates a flowchart of a general process 400 for speaker recognition according to an exemplary embodiment of the present invention. According to operation S410 in this figure, a DNN with a triplet network architecture is trained. For conducting speaker recognition on a particular user, it is contemplated that the DNN will be trained on the basis of at least one positive speech sample obtained from the user, in combination with multiple negative speech samples obtained from other speakers (and, possibly, an unknown speaker). As illustrated FIG. 4, the speech samples used for training the DNN may be extracted from storage in the memory device 24. After the DNN is trained, a particular user can be registered or enrolled by the speaker registration subsystem 20 in operation S420. This means that a "speaker model" may be generated for the particular user, for purpose of future comparison with a feature representation or voiceprint of the same user to perform speaker verification. Thereafter, a recognition speech sample is obtained in operation S430. The recognition speech sample may be obtained, e.g., from the input device 10. In operation S440 of FIG. 4, the recognition speech sample is fed through the DNN (i.e., neural network 242), and the output of the DNN responsive to the recognition speech sample is used in operation S450 (along with the aforementioned speaker model) to perform speaker recognition, i.e., either verify or identify the user on the basis of the DNN output.

Figure 5:
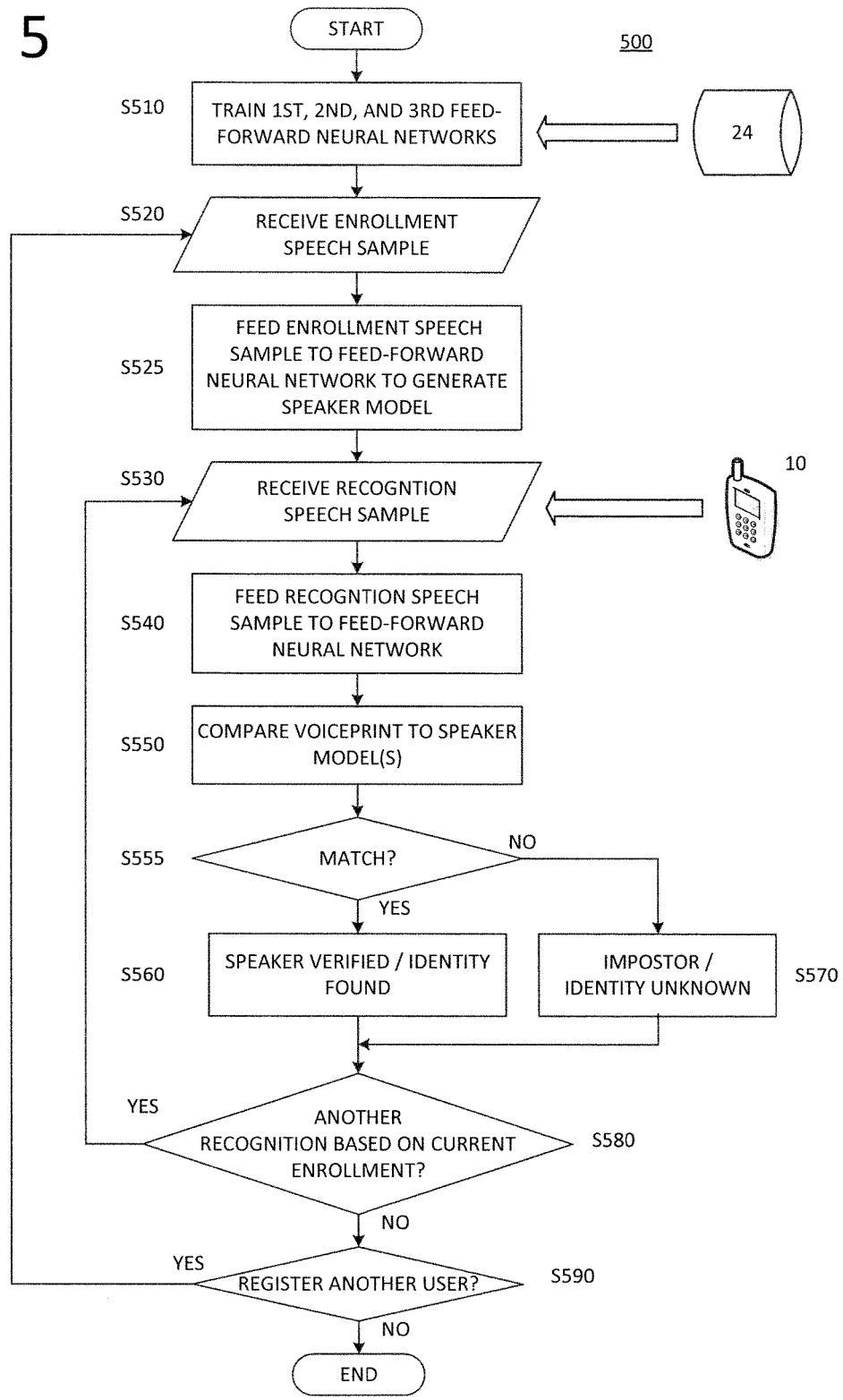
FIG. 5 illustrates a flowchart of a process of utilizing a deep neural network of triplet network architecture to perform speaker recognition, according to an exemplary embodiment of the present invention.

FIG. 5 illustrates a flowchart of a more specific process 500 for conducting speaker recognition on a particular user, according to an exemplary embodiment of the present invention. In operation S510 of FIG. 5, the DNN, which comprised of the first, second, and third feed-forward neural networks 212, 222, 232, is trained by the computer system 22 using speech samples stored in the memory device 24. Exemplary embodiments of this training process will be described in more detail in connection with FIG. 6. It should be noted that the memory device 24 may contain a bank of speech samples useful for training the DNN in batches corresponding to a plurality of different users. Therefore, training the DNN, according to S510, may include any necessary steps for sorting and extracting speech samples in the memory device 24 according to speaker.

After the DNN is trained as a result of S510, the computer system 22 is operable to use the DNN to perform speaker recognition in regard to a list of registered (or enrolled) users. This means that the DNN can perform verification by determining whether a speaker, who claims to be one of the registered (enrolled) users, is in fact whom he/she claims to be. It also means that the DNN can identify an anonymous speaker if he/she is actually on the list of registered (enrolled) users, and if the speaker is not on this list, indicate that the speaker is unknown. As such, in exemplary embodiments of the present invention, a speaker model is generated for each user who is enrolled or registered. A particular example of generating such a speaker model, in order to enroll a particular user is disclosed in connection with operations S520 and S525 of FIG. 5.

In operation S520 of FIG. 5, the enrollment of a particular user is initiated by receiving a corresponding enrollment speech sample (i.e., a speech sample actually uttered by the particular user). In operation S525, the enrollment speech sample is feed through the feed-forward neural network 242 (as described above in connection with FIG. 2B and FIG. 3B) in order to output a corresponding voiceprint (or feature representation). The voiceprint produced by the feed-forward neural network 242 may be subsequently stored in memory device 24 and used as a speaker model for the registered user. Also, it is possible that more than one enrollment speech sample from a user may be received, and used to register that user. In this case, the multiple enrollment samples can be fed through the feed-forward neural network 242 in order to produce multiple voiceprints for the user. In this case, a mean vector can be computed from the multiple voiceprints, and used as a speaker model for the user.

Operations S520 and S525 of FIG. 5 describe an example of the "enrollment" functionality of a DNN, according to an exemplary embodiment. However, it is not a requirement of the present invention that a DNN be used, in the aforementioned manner, to generate the speaker models for the registered users.

According to the sequence of operations S530 through S560 in FIG. 5, speaker recognition can be performed on a particular user. As such, these operations correspond to the "testing" functionality of a DNN according to exemplary embodiments of the present invention.

In S530 a recognition speech sample is received from the user via the device 10. This recognition speech sample is then fed into the feed-forward neural network 242 in operation S530, and in response this feed-forward neural network 242 produces at the network output 244 a feature representation or voiceprint of the user's recognition speech sample.

In operation S540 of FIG. 5, the voiceprint or feature representation, which is outputted by the feed-forward neural network 242 in response to the recognition speech sample, is used to verify or identify the user. Particularly, this voiceprint may be compared to one or more speaker models, which were generated according to operation S525 and stored in the memory device 24 in connection with one or more registered users. As mentioned above, each of these speaker models may be a voiceprint similarly produced by the feed-forward neural network 242. According to decision box S550, a decision is made as to whether the voiceprint obtained by the neural network 242 as a result of the recognition speech sample "matches" any of the stored speaker models. Assuming that each speaker model is a similarly-generated voiceprint, this match may be determined according to a measure of similarity (or distance) between the two voiceprints. On the other hand, if each speaker model comprises a different representation of speech features of the corresponding user, a different process may be used in S540 and S550 to compare the voiceprint to respective features of the speaker model and determine whether a match exists.

If S550 decides that a match occurs between the voiceprint of the recognition speech sample, and one of the stored speaker models, the process 500 proceeds to S560 indicating that the identity of the particular user has been authenticated (in a speaker verification task), or that the identity of the particular user has been located in a predefined list or set of known identities (in a speaker identification task). On the other hand, if S550 decides that no match has occurred, the process 500 proceeds to S570 indicating that the particular user is not whom he/she claims to be (and thus is an impostor), or that his/her identity is unknown to the speaker recognition subsystem 20. These results can be outputted by the computing system 22, e.g., on a display and/or audio output of, or the results can be transmitted to another location to be outputted, or otherwise sent and used by the end application 30. For instance, in both speaker verification and identification tasks, an end application 30 may be use the results to permit/deny the user access to a particular resource or path. For instance, the end application 30 could be used to block a user's telephone call when the user is identified as being a member of a blacklist or a blocked caller's list. The application 30 may also be used to automatically flag (or alert authorities about) a user who is lying about his/her identity.

Referring again to FIG. 5, after one speaker recognition task is performed, the DNN may be used to perform another speaker recognition task on a particular sample, based on the current pool of registered users, as illustrated in S580 (with the process 500 returning to S530 to receive a new recognition speech sample). It is also contemplated that another speaker may need to be enrolled, i.e., added to the pool of registered users, for purposes of conducting future speaker recognition tasks. As illustrated in S590, if a new user needs to be enrolled or registered, the process 500 returns to operation S520 whereby a new speaker model is generated.

Next, a more specific description will provided in regard to the process whereby the DNN is trained for each registered user, in accordance with operation S510 of FIG. 5.

Figure 6:
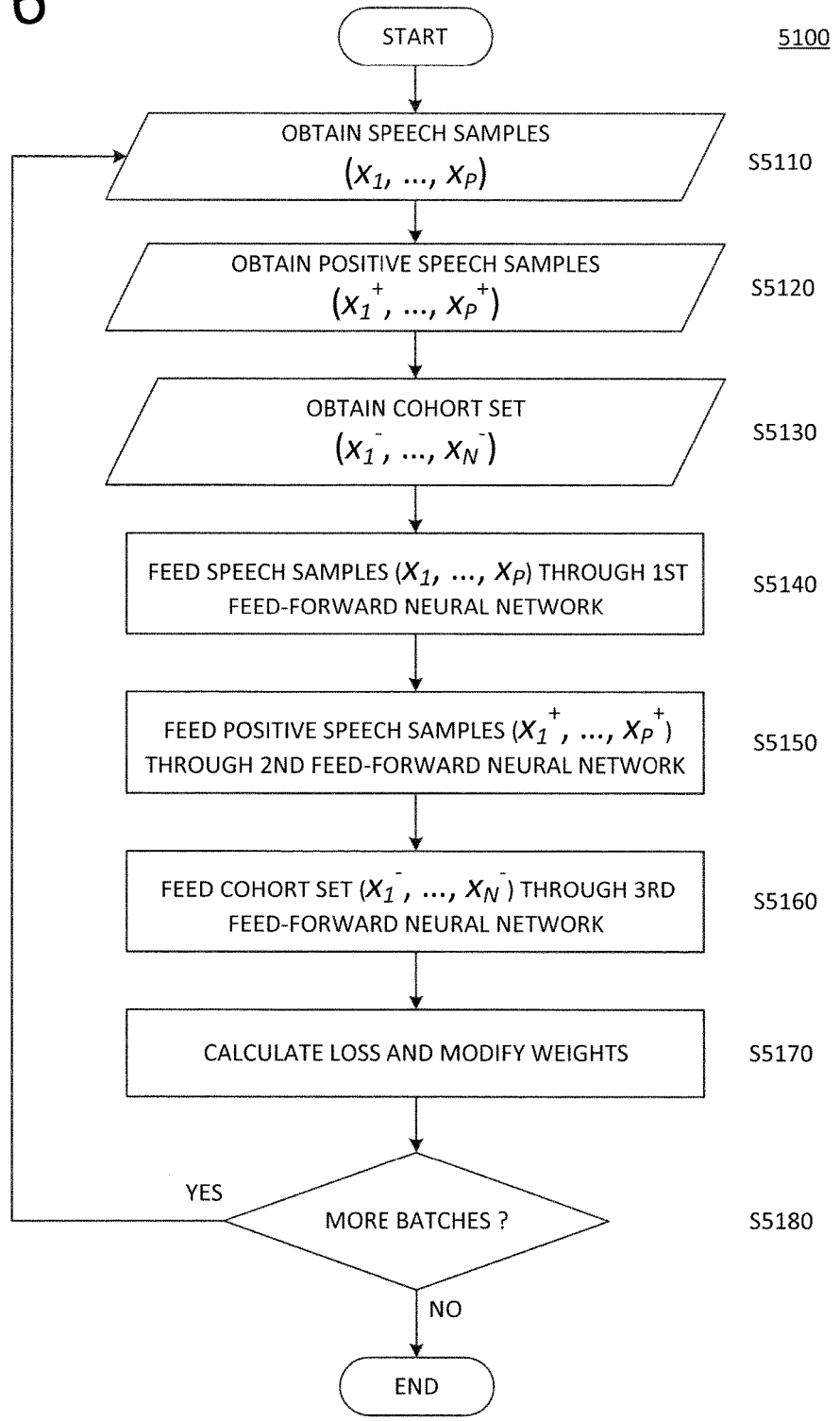
FIG. 6 is a flowchart of a process for training a deep neural network with a triplet network architecture, according to an exemplary embodiment of the present invention.

In particular, FIG. 6 is a flowchart of a process 5100 for training the DNN according to an exemplary embodiment of the present invention. This training of the DNN can be performed according to a batch process, whereby a loss function is computed after a batch of training samples are fed through the DNN. For each batch, a set of P speech samples designated as $x_i$ (i=1, ..., P), all spoken by the same speaker, are sequentially applied through the first feed-forward neural network 212. Also, for each batch, a corresponding set of P positive speech samples $x_i^+$ (i=1, ..., P), all spoken by the same speaker as the $x_i$ samples, are sequentially applied to the second feed-forward neural network 222. As to the third feed-forward neural network 232, a "cohort set" of negative speech samples $x_1^-, x_2^-, \ldots x_N^-$ (which were spoken by a different speaker than the person who spoke the $x_i$ and $x_i^+$ speech samples) are successively inputted into the third feed-forward neural network 232 during each batch. According to a non-limiting example, the number N of negative speech samples in the cohort set (and the number of iterations run for each batch) may equal 1000. However, the cohort set may contain a different number of negative speech samples. It is possible that the same cohort set of negative speech samples can be used for multiple batches, or possibly all batches, during training of the DNN. Also, while it is contemplated that each negative speech sample will be spoken by a different person than the speaker of the $x_i$ and $x_i^+$ speech samples, it is also possible to utilize a speech sample of unknown origin (i.e., the speaker's identity is unknown) as one of the negative speech samples in the cohort set.

Referring to FIG. 6, according to operation S5110, a set of P speech samples $x_i$ from a particular speaker are extracted from the memory device 24. Likewise, in operation S5120, a set of P positive speech samples from the same speaker are also extracted from the memory device 24. The number P of positive speech samples should be at least two, and it is contemplated that P will be more than two. Further, according to operation S5130, the cohort set of N negative speech samples are obtained from the memory device 24.

As mentioned above, the deep neural network (DNN) will perform training in batches such that, in each batch, a set of P speech samples $x_i$ (i=1, ..., P) and a corresponding set of P positive speech samples $x_i^+$ (i=1, ..., P), all originating from the same speaker, are fed through the first and second feed-forward neural networks 212 and 222, respectively. The set of P speech samples $x_i$ (i=1, ..., P) are successively fed through the first neural network 212 in operation S5140, while the set of P positive speech samples $x_i^+$ (i=1, ..., P) are fed through the second feed-forward neural network 222 in operation 5150. In operation S5160, the N negative speech samples in the cohort set are successively fed through the third feed-forward neural network 232.

After a given batch has been processed through the DNN as thus described, operation S5170 is performed. This operation calculates a loss based on the sets of embedding vectors generated as a result of feeding the speech samples $x_i$, the positive speech samples $x_i^+$, and the cohort set $X^-$ of negative speech samples $x_1^-, \ldots, x_N^-$ through the DNN. Further, according to S5170, the calculated loss is used to modify the connection weights in each of the first, second, and third feed-forward neural networks 212, 222, 232. In particular, a backpropagation technique utilizing a stochastic gradient descent optimizer may be used to modify the weights once the loss has been calculated. The function for calculating the loss will be described in more detail below.

The loss function, which used for calculating the loss for each batch (i.e., for each set of P speech samples $x_i$ and corresponding set of P positive speech samples $x_i^+$), is based on the following parameters:
- a degree of similarity $S_+$ between the first network output 214 responsive to each speech sample $x_i$ (i.e., the embedding vector $EVx_i$) and the second network output 224 responsive to the corresponding positive speech sample $x_i^+$ (i.e., the embedding vector $EVx_i^+$),
- a degree of similarity $S_-$ between the first network output 214 responsive to each speech sample $x_i$ (i.e., $EVx_i$), and a most similar one of the third network outputs 234 responsive to the cohort set (i.e., the most similar of the feature representations $EVx_i^-, \ldots, EVx_N^-$),
- a positive margin $M_+$ and a negative margin $M_-$ which are respectively applied to the degrees of similarity $S_+$ and $S_-$,
- a positive distance $d_+$ calculated on the basis of the degree of similarity $S_+$ and the corresponding margin $M_+$, and
- a negative distance $d_-$ calculated on the basis of the degree of similarity $S_-$ and the corresponding margin $M_-$.

The use of the positive margin $M_+$ and the negative margin $M_-$ help to avoid additional costs in the loss function under the situations where speech samples $x_i$ and $x_i^+$ are reasonably close to one another, and where speech sample $x_i$ is reasonably far from the closest of the negative speech samples.

According to an exemplary embodiment, the loss function for each batch may be defined as follows:

$$\text{Loss} = \sum_{i=1}^{P} L(x_i, x_i^+, X^-) \quad \text{Equation (1)}$$

where $$L(x_i, x_i^+, X^-) = K \frac{e^{d_+}}{e^{d_+} + e^{d_-}}. \quad \text{Equation (2)}$$

In Equation (2), K represents a constant (e.g., 1000). Further, the positive and negative distances $d_+$ and $d_-$ in Equation (2) may be calculated according to the following equations:

$$d_+ = 2(1 - \min((S_- + M_+), 1)) \quad \text{Equation (3)}$$

and $$d_- = 2(1 - \max((S_- + M_- - 1), 0)) \quad \text{Equation (4)}.$$

As indicated in Equations (3) and (4), the positive and negative distances $d_+$ and $d_-$ are respectively calculated based on similarities $S_+$ and $S_-$ and corresponding margins $M_+$ and margin $M_-$. These similarities $S_+$ and $S_-$ may be calculated according to the following equations:

$$S_+ = \frac{1}{2}(1 + \cos(EVx_i, EVx_i^+)) \quad \text{Equation (5)}$$

and $$S_- = \frac{1}{2}(1 + \max_{n=1:N}(\cos(EVx_i, EVx_n^-))). \quad \text{Equation (6)}$$

In Equation (5), the max operator extracts the one of the feature representations $EVx_i^-, \ldots, EVx_N^-$, produced by the third feed-forward neural network 232 based on the cohort set, which is most similar to the feature representation $EVx_i$.

Also, the positive and negative margins $M_+$ and $M_-$ may be calculated according to the following equations:

$$M_+ = \frac{1 - \cos(\frac{\pi}{4})}{2} \quad \text{Equation (7)}$$

and $$M_- = \frac{1 - \cos\left(\frac{3\pi}{4}\right)}{2}.$$ Equation (8)

According to Equations (5) through (8), the similarities ($S_+$ and $S_-$) and the margins ($M_+$ and $M_-$), which are used to determine the respective distances ($d_+$ and $d_-$), are computed in terms of a cosine measure. The use of distances based on a cosine measure, along with the use of positive and negative margins, provide for a robust representation of voiceprints.

Referring again to FIG. 6, when the loss function is calculated for a given batch, the computed loss is used in operation S5170 to modify connection weights in each of the first, second, and third feed-forward neural networks 212, 222, 232 according to, e.g., a backpropagation technique using a stochastic gradient descent optimizer. If, for example, when the DNN has the specific configuration as illustrated in FIG. 3A, the computed loss may be used to modify weights in connection with the first convolutional layer, the second convolutional layer, and the fully connected layer.

It is also noted that a dropout training algorithm may be used, in conjunction with the backpropagation technique, to modify the weights. Particularly, in a dropout algorithm, a certain portion or percentage of the neurons during training are dropped during training in order to prevent modification of their corresponding weights. For instance, the dropout algorithm may be applied so that only 80% (or even just 50%) of the weights are modified as a result of a given batch.

In the process 5100 of FIG. 6, after connection weights of the DNN are modified according to the calculated loss for a given batch according to operation S5170, a determination is made in S5180 as to whether the DNN is to be trained according to any more batches (i.e., different sets of speech samples $x_i$ and positive $x_i^+$ corresponding to different speakers). If there are more batches to be processed, processing returns to operation S5110 to extract the necessary samples and start processing the new batch. Otherwise, in FIG. 6, training for the DNN is considered to be completed.

Figure 4:
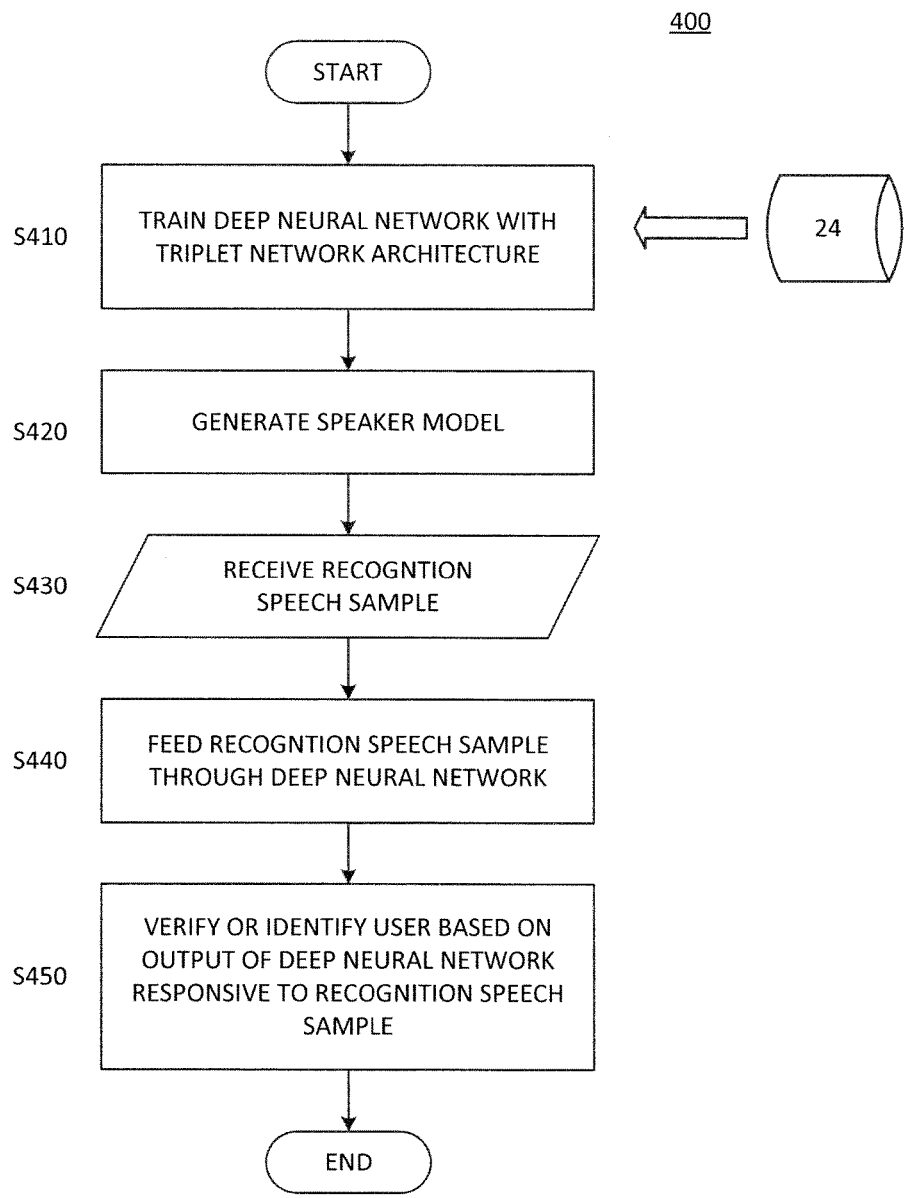
FIG. 4 illustrates a flowchart of a general process for speaker recognition according to an exemplary embodiment of the present invention.

It should be noted that the flowcharts in FIGS. 4-6 are provided for purposes of illustration only, and are not intended to be limiting on the present invention as defined by the attached claims. The processes disclosed in these figures may be modified and still remain within the spirit and scope of the present invention. For instance, whereas each of these flowcharts illustrates a sequence of operations, the order of these operations may be changed, and certain operations illustrated in these flowcharts may be omitted, while other operations not shown may be added.

Similarly, the structures and configurations illustrated in FIGS. 1, 2A, 2B, and 3A-3C are also provided for purposes of illustration only. The system and neural network configurations illustrated therein may be modified in any manner that is consistent with the spirit and scope of the invention.

ALTERNATIVE EMBODIMENT

In the above-described embodiments, a DNN with a triplet network architecture is trained to perform both the speaker recognition tasks of verification (detecting if an actual speaker is who he/she claims to be) and of identification (matching the identity of the speaker to someone in a closed set). In such an embodiment, the DNN model for the triplet network architecture may include a structure as illustrated in FIG. 3A and FIG. 3B, and further may be trained according to process shown in FIG. 6. In this case, the parameters of the DNN model for the triplet network architecture may be initialized randomly, prior to training.

However, according to an alternative embodiment, the DNN may be designed specifically for the task of identification, and a different DNN structure and method of training may be employed. For instance, instead of randomly initializing the parameters of the DNN model with the triplet network architecture, the parameters may instead be initialized with those of a DNN specifically trained to perform the speaker identification task on a closed set of speakers, where the output classes are the different speaker labels. Further, during such speaker identification training, the structure of the DNN may be based on that of the feed-forward neural networks 212, 222, 232, 242 illustrated in FIG. 3A and FIG. 3B, but modified with at least two additional layers: (1) a softmax layer, and (2) an output layer including multiple units for the respective speakers in the training set.

For instance, these additional layers may be appended to the feed-forward neural network structure illustrated FIG. 3A and FIG. 3B. As previously described, each of the feed-forward neural networks illustrated in FIG. 3A and FIG. 3B conclude with a fully-connected layer and a subsequent layer for producing an embedding vector or voiceprint. According to the alternative embodiment, this subsequent layer can be transformed into a second fully-connected layer, which feeds the appended softmax layer and output layer. The softmax layer executes a function, which is sometimes referred to as a normalized exponential, and is a generalization of the sigmoid function. The softmax function is used in various probabilistic multi-class classification techniques, including those implemented by artificial neural networks. As to the appended output layer, the number of neural units in this layer is equivalent to number of speakers, which the DNN is trained to identify. For instance, in a non-limiting example where the DNN is trained to perform speaker identification on 3000 different speakers, the output layer would include 3000 different units.

After a DNN (with the appended layers) has been trained to conduct speaker identification on the closed set of speakers, the trained parameters may then be imported into the first, second, and third feed-forward neural networks 212, 222, 232 for subsequent training based on the loss function, e.g., according to the process described above in connection with FIG. 6.

Figure 7:
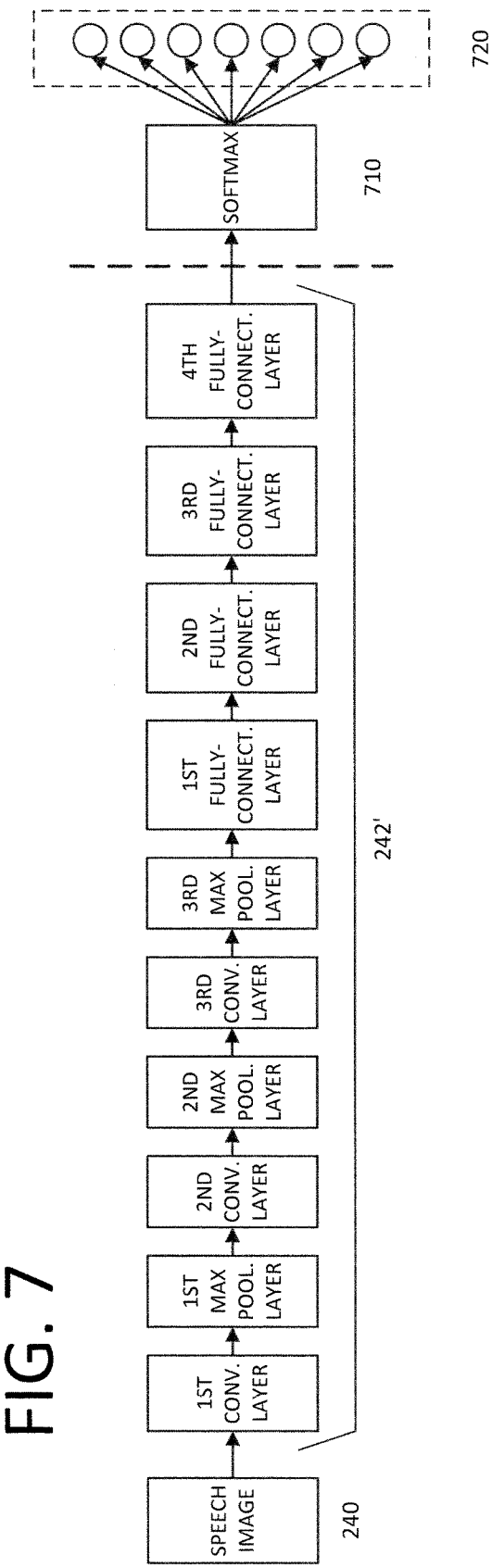
FIG. 7 illustrates an example of the structure of a deep neural network with a triplet network architecture, designed to incorporate the softmax function and be pre-trained to specifically perform speaker identification.

While this alternative embodiment may be based on the structure illustrated in FIG. 3A and FIG. 3B as described above, it is contemplated that other modifications can also be made to the structure of the feed-forward neural networks in this alternative embodiment. For example, FIG. 7 illustrates a specific example of a structure of a DNN that can be used in connection with the alternative embodiment. Using the structure of the feed-forward neural network 242 of FIG. 3B as a reference, FIG. 7 illustrates a feed-forward neural network 242' with a modified structure incorporating three convolutional layers, three max pooling layers, and four fully-connected layers. In FIG. 7, the fourth fully-connected layer is connected to a softmax layer 710, and an output layer 720 comprised of a number of units (equivalent to the number of speakers which the DNN is trained to identify). After the speaker identification training is conducted, the parameters may then be imported into respective feedforward neural networks according to the triplet network architecture, and trained based on the aforementioned loss function.

SECOND ALTERNATIVE EMBODIMENT

It is noted that, in the description of the training process illustrated in FIG. 6, a specific loss function was described above in connection with Equations (1)-(8). However, it is not a requirement that the DNN be trained according to the particular loss function, which was described above in connection with FIG. 6. In an alternative exemplary embodiment, for instance, a different loss function that is directly related to the Equal Error Rate (EER) metric may be used to train the DNN.

The EER metric is typically used to assess the accuracy of a speaker recognition system. In speaker recognition and other biometric systems, an EER is used to pre-determine threshold values for equalizing the false acceptance rate and false rejection rate. The EER is derived under the assumption that the distribution of positive recognition scores (indicating a match) and negative recognition scores (indicating a mismatch) are Gaussian, and can be expressed by the following equation:

$$EER = \frac{1}{2} - \frac{1}{2}\text{erf}\left(\frac{\mu_+ - \mu_-}{(\sigma_+ + \sigma_-)\sqrt{2}}\right). \quad \text{Equation (9)}$$

In Equation (9), the term erf(z) represents the error function, while $\mu_+$ and $\sigma_+$ are the mean and standard deviation of the positive recognition scores, and $\mu_-$ and $\sigma_-$ are the mean and standard deviation of the negative recognition scores. In this case, the positive and negative recognition scores are analogous to the degrees of similarities $S_+$ and $S_-$ mentioned above in connection with the loss function of Equations (1)-(8). As such, the mean and standard deviation of the positive recognition scores ($\mu_+$ and $\sigma_+$), and the mean and standard deviation of the negative recognition scores ($\mu_-$ and $\sigma_-$), can be derived from a batch processing as follows:

$$\mu_+ = \frac{1}{P}\sum_{i=1}^{P} \cos(EVx_i, EVx_i^+) \quad \text{Equation (10)}$$

$$\sigma_+^2 = \frac{1}{P}\sum_{i=1}^{P} [\cos(EVx_i, EVx_i^+) - \mu_i]^2 \quad \text{Equation (11)}$$

$$\mu_- = \frac{1}{N}\sum_{i=1}^{N} \cos(EVx_i, EVx_i^-) \quad \text{Equation (12)}$$

$$\sigma_-^2 = \frac{1}{N}\sum_{i=1}^{N} [\cos(EVx_i, EVx_i^-) - \mu_i]^2 \quad \text{Equation (13)}$$

where symbols P, N, $EVx_i$, $EVx_i^+$, and $EVx_i^-$ have the same meanings as defined above in connection with Equations (1)-(8).

As shown in Equation (9) above, minimizing the value of EER implies a maximization of the term $$\frac{\mu_+ - \mu_-}{(\sigma_+ + \sigma_-)\sqrt{2}}.$$

using this logic, a loss function, which is to be minimized during training, may be defined as follows:

$$\text{Loss} = e^{-\frac{\mu_+ - \mu_-}{(\sigma_+ + \sigma_-)\sqrt{2}}}. \quad \text{Equation (14)}$$

Therefore, as an alternative to the loss function described in connection with Equations (1)-(8), a DNN with the triplet network architecture may be trained according to the loss function defined according to Equation (14). However, other loss functions may also be used to train the DNN, and the present invention is not to be limited to a particular loss function.

While particular embodiments have been described above for purposes of example, they are not intended to be limiting on the present invention whose metes and bounds have been defined in the accompanying claims.

The invention claimed is:

1. A speaker recognition device comprising:
    a memory device storing speech samples including,
        dual sets of speech samples attributed to the same speaker,
        a cohort set of speech samples not attributed to the same speaker as the dual sets, and
        a set of speaker models; and
    a processor-based device configured to model a deep neural network with a triplet network architecture,
    wherein the processor-based device trains the deep neural network according to a batch process in which the dual sets of speech samples are fed through the deep neural network in combination with the cohort set of speech samples, and
    wherein the processor-based device feeds a recognition speech sample through the trained deep neural network, and verifies or identifies a user based on an output of the trained deep neural network responsive to the recognition speech sample and at least one of the speaker models.

2. The speaker recognition device of claim 1, wherein the deep neural network includes,
    a first feed-forward neural network which receives and processes a first input to produce a first network output,
    a second feed-forward neural network which receives and processes a second input to produce a second network output, and
    a third feed-forward neural network which receives and processes a third input to produce a third network output,
    for each of a plurality of speakers, the memory device includes a first set of P speech samples ($x_1, \ldots, x_P$) attributed to the speaker and a second set of P speech samples ($x_1^+, \ldots, x_P^+$) attributed to the speaker, with P being an integer greater than or equal to 2; and
    the deep neural network is trained by the processor-based device such that, for each of the plurality of speakers,
        the deep neural network performs a batch processing during which the corresponding first set of speech samples are fed through the first feed-forward neural network, the corresponding second set of speech samples are fed through the second feed-forward neural network, and the cohort set of speech samples are fed through the third feed-forward neural network;
        upon completion of the batch processing, a loss function is computed based on the first network outputs, the second network outputs, and the third network outputs obtained based respectively on the corresponding first set of speech samples, the corresponding second set of speech samples, and the cohort set of speech samples; and the computed loss function is used to modify connection weights in each of the first, second, and third feed-forward neural networks according to a back propagation technique.

3. The speaker recognition device of claim 2, wherein the loss function is based on:
a positive distance $d_+$ corresponding to a degree of similarity $S_+$ between the first network output responsive to one of the first set of speech samples $x_i$ and the second network output responsive to a corresponding one of the second set of speech samples $x_i^+$, and
a negative distance $d_-$ corresponding to a degree of similarity $S_-$ between the first network output responsive to the one of the first set of speech samples $x_i$ and a most similar one of the third network outputs responsive to respective speech samples of the cohort set.

4. The speaker recognition device of claim 3, wherein the positive distance $d_+$ and the negative distance $d_-$ are determined by applying different respective margins $M_+$, $M_-$ to the corresponding degrees of similarity $S_+$, $S_-$.

5. The speaker recognition device of claim 4, wherein the loss function is defined by:

$$\text{Loss} = \sum_{i=1}^{P} L(x_i, x_i^+, X^-), \text{ where}$$

$L(x_i, x_i^+) = Ke^{d_+}/e^{d_+} + e^{d_-}$,
$d_+ = 2(1 - \min((S_+ + M_+), 1))$,
$d_- = 2(1 - \max((S_- + M_- - 1), 0))$,
$S_+ = \frac{1}{2}(1 + \cos(EVx_i, EVx_i^+))$,
$S_- = \frac{1}{2}(1 + \max_{n=1:N}(\cos(EVx_i, EVx_n^-)))$,
$x_n^-$ is the n-th one of the N negative speech samples fed during the N iterations,
$EVx_i$ is the first network output responsive to one of the first set of speech samples,
$EVx_i^+$ is the second network output responsive to one of the second set of speech samples,
$EVx_n^-$ is the third network output responsive to the negative speech sample $x_n^-$,
$M_+ = 1 - \cos(\pi/4)/2$,
$M_- = 1 - \cos(3\pi/4)/2$, and
K is a constant.

6. The speaker recognition device of claim 1, wherein each of the first, second, and third feed-forward neural networks includes at least one convolutional layer and a fully connected layer.

7. The speaker recognition device of claim 6, wherein each of the first, second, and third feed-forward neural networks further includes at least one max-pooling layer and a subsequent fully connected layer.

8. The speaker recognition device of claim 6, wherein each speech sample, which is inputted to a respective one of the first, second, and third feedforward neural networks, is preprocessed by:
partitioning an underlying speech signal into a plurality of overlapping windows; and
extracting a plurality of features from each of the overlapping windows.

9. The speaker recognition device of claim 8, wherein each of the first, second, and third feed-forward neural networks includes a first convolutional layer to receive the preprocessed speech sample,
the first convolutional layer comprises a number $N_C$ of convolutional filters,
each of the $N_C$ convolutional filters has $F \times w_f$ neurons, where F corresponds to the height of the first convolutional layer, and $w_f$ corresponds to the width of the convolutional layer, and
F is equivalent to the number of the features extracted from each of the overlapping windows, and $w_f$ is no greater than 5.

10. The speaker recognition device of claim 1, wherein the device is configured to perform a speaker verification task in which the user inputs a self-identification, and the recognition speech sample is used to confirm that an identity of the user is the same as the self-identification.

11. The speaker recognition device of claim 1, wherein the device is configured to perform a speaker identification task in which the recognition speech sample is used to identify the user from a plurality of potential identities stored in the memory device in association with respective speech samples.

12. The speaker recognition device of claim 1, further comprising an input device which receives a speech sample from the user as the recognition speech sample.

13. A method comprising:
training a computer-implemented model of a deep neural network with a triplet network architecture based on a plurality of speech samples stored in a memory device, the plurality of speech samples including:
dual sets of speech samples attributed to the same speaker,
a cohort set of speech samples not attributed to the same speaker as the dual sets, and
a set of speaker models;
feeding a recognition speech sample through the trained deep neural network, and verifying or identifying a user based an output of the trained deep neural network responsive to the recognition speech sample and at least one of the speaker models,
wherein the training of the deep neural network is performed according to a batch process in which the dual sets of speech samples are fed through the deep neural network in combination with the cohort set of speech samples.

14. The method of claim 13, wherein
the deep neural network comprises,
a first feed-forward neural network each iteration of which receives and processes a first input in order to produce a first network output,
a second feed-forward neural network each iteration of which receives and processes a second input to produce a second network output, and
a third feed-forward neural network each iteration of which receives and processes a third input to produce a third network output,
for each of a plurality of speakers, the memory device includes a first set of P speech samples $(x_1^+, \ldots, x_P^+)$ attributed to the speaker and a second set of P speech samples $(x_1^+, \ldots, x_P^+)$ attributed to the speaker, with P being an integer greater than or equal to 2; and
the deep neural network is trained such that, for each of the plurality of speakers,
the deep neural network performs a batch processing during which the corresponding first set of speech samples are fed through the first feed-forward neural network, the corresponding second set of speech samples are fed through the second feed-forward neural network, and the cohort set of speech samples are fed through the third feed-forward neural network;

upon completion of the batch processing, a loss function is computed based on the first network outputs, the second network outputs, and the third network outputs obtained based respectively on the corresponding first set of speech samples, the corresponding second set of speech samples, and the cohort set of speech samples; and the computed loss function is used to modify connection weights in each of the first, second, and third feed-forward neural networks according to a back propagation technique.

15. The method of claim 14, wherein the loss function computed for $x_i^+$ is based on:

a positive distance $d_+$ corresponding to a degree of similarity $S_+$ between the first network output responsive to one of the first set of speech samples $x_i$ and the second network output responsive to a corresponding one of the second set of speech samples $x_i^+$, and a negative distance $d_-$ corresponding to a degree of similarity $S_-$ between the first network output responsive to the one of the first set of speech samples $x_i$ and a most similar one of the third network outputs responsive to respective speech samples of the cohort set.

16. The method of claim 15, wherein the positive distance $d_+$ and the negative distance $d_-$ are determined by applying different respective margins $M_+$, $M_-$ to the corresponding degrees of similarity $S_+$, $S_-$.

17. The method of claim 16, wherein the loss function is defined by:

$$\text{Loss}=\Sigma_{i=1}^{P} L(x_i, x_i^+, X^-), \text{ where}$$

$L(x_i, x_i^+, X^-)=Ke^{d_+}/e^{d_+}+e^{d_-}$,
$d_+=2(1-\min((S_++M_+),1))$,
$d_-=2(1-\max((S_-+M_--1),0))$,
$S_+=\frac{1}{2}(1+\cos(EVx_i, EVx_i^+))$,
$S_-=\frac{1}{2}(1+\max_{n=1:N}(\cos(EVx_i, EVx_n^-)))$,
$x_n^-$ is the n-th one of the N negative speech samples fed during the N iterations,
$EVx_i$ is the first network output responsive to one of the first set of speech samples,
$EVx_i^+$ is the second network output responsive to one of the second set of speech samples,
$EVx_n^-$ is the third network output responsive to the negative speech sample $x_n^-$,
$M_+=1-\cos(\pi/4)/2$,
$M_-1-\cos(3\pi/4)/2$, and
K is a constant.

18. The method of claim 14, wherein the loss function is defined by:

$$\text{Loss}=e^{\mu_+-\mu_-/(\sigma_++\sigma_-)\sqrt{2}}, \text{ where}$$

$\mu_+$ and $\sigma_+$ are the mean and standard deviation of positive recognition scores based on a Gaussian distribution, and $\mu_-$ and $\sigma_-$ are the mean and standard deviation of negative recognition scores based on a Gaussian distribution.

19. The method of claim 13, wherein each of the first, second, and third feed-forward neural networks includes at least one convolutional layer and a fully connected layer.

20. The method of claim 19, wherein each of the first, second, and third feed-forward neural networks further includes at least one max-pooling layer and a subsequent fully connected layer.

21. The method of claim 20, wherein each of the first, second, and third feed-forward neural networks further includes a softmax layer and an output layer, and parameters of the deep neural network are initialized with parameters of a neural network pre-trained to perform speaker identification task on a closed set of speakers, wherein the output layer includes a separate neural unit for each of the speakers.

22. The method of claim 19, further comprising preprocessing each speech sample, which is inputted to a respective one of the first, second, and third feedforward neural networks by:

partitioning an underlying speech signal into a plurality of overlapping windows; and extracting a plurality of features from each of the overlapping windows.

23. The method of claim 22, wherein each of the first, second, and third feed-forward neural networks includes a first convolutional layer to receive the preprocessed speech sample, the first convolutional layer comprises a number $N_C$ of convolutional filters, each of the $N_C$ convolutional filters has $F \times w_f$ neurons, where F corresponds to the height of the first convolutional layer, and $w_f$ corresponds to the width of the convolutional layer, and F is equivalent to the number of the features extracted from each of the overlapping windows, and $w_f$ is no greater than 5.

24. The method of claim 13, wherein a speaker verification task is performed in which the user inputs a self-identification, and the recognition speech sample is used to confirm that an identity of the user is the same as the self-identification.

25. The method of claim 13, wherein a speaker identification task is performed in which the recognition speech sample is used to identify the user from a plurality of potential identities stored in the memory device in association with respective speech samples.

26. The method of claim 13, further comprising receiving a speech sample from the user, via an input device, as the recognition speech sample.

* * * * *